(12) United States Patent
Shibayama et al.

(10) Patent No.: US 12,174,687 B2
(45) Date of Patent: Dec. 24, 2024

(54) IMAGE RECOGNITION DEVICE AND IMAGE RECOGNITION METHOD

(71) Applicant: SONY SEMICONDUCTOR SOLUTIONS CORPORATION, Kanagawa (JP)

(72) Inventors: Noribumi Shibayama, Kanagawa (JP); Takaki Ueno, Kanagawa (JP); Kazuyuki Okuike, Kanagawa (JP); Satomi Kawase, Kanagawa (JP); Suguru Kobayashi, Kanagawa (JP); Toshihisa Miyake, Kanagawa (JP); Goshi Watanabe, Kanagawa (JP); Takafumi Asahara, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/995,893

(22) PCT Filed: Mar. 2, 2021

(86) PCT No.: PCT/JP2021/007945
§ 371 (c)(1),
(2) Date: Oct. 10, 2022

(87) PCT Pub. No.: WO2021/215116
PCT Pub. Date: Oct. 28, 2021

(65) Prior Publication Data
US 2023/0161399 A1 May 25, 2023

(30) Foreign Application Priority Data
Apr. 22, 2020 (JP) .................................. 2020-075959

(51) Int. Cl.
*G06V 10/80* (2022.01)
*G06F 1/26* (2006.01)
(Continued)

(52) U.S. Cl.
CPC ................ *G06F 1/329* (2013.01); *G06F 1/26* (2013.01); *G06F 1/3203* (2013.01); *G06F 1/3287* (2013.01); *G06V 10/811* (2022.01)

(58) Field of Classification Search
CPC .......... G06F 1/329; G06F 1/26; G06F 1/3203; G06F 1/3287; G06F 1/3215; G06F 1/3278; G06V 10/811; G06V 20/58; G06T 7/00
See application file for complete search history.

(56) References Cited

U.S. PATENT DOCUMENTS

| 11,017,513 B1* | 5/2021 | Yarlagadda | G06F 18/256 |
| 2014/0159856 A1* | 6/2014 | Meyer | G05B 11/01 |
| | | | 340/5.1 |

(Continued)

FOREIGN PATENT DOCUMENTS

| JP | 2007-310741 A | 11/2007 |
| JP | 2019-062324 A | 4/2019 |
| JP | 2019-175423 A | 10/2019 |

OTHER PUBLICATIONS

International Search Report and Written Opinion of PCT Application No. PCT/JP2021/007945, issued on May 25, 2021, 08 pages of ISRWO.

*Primary Examiner* — Jaweed A Abbaszadeh
*Assistant Examiner* — Brian J Corcoran
(74) *Attorney, Agent, or Firm* — CHIP LAW GROUP

(57) ABSTRACT

An image recognition device capable of reducing power, a calculation amount, a memory occupancy amount, and a bus band occupancy amount and maintaining high recognition accuracy is provided. An image recognition device includes a plurality of signal processing modules that connects a plurality of image sensors having different functions, performs signal processing on the basis of image signals output from connected image sensors and including an object within an imaging visual field, and is each capable of being controlled for power source supply, a recognition processing unit that selectively performs recognition processing of the object by an output signal of one signal processing module and recognition processing of the object with fusion of corresponding output signals of the plurality of signal processing modules, and a control unit that supplies a power source to at least one signal processing module, causes the recognition processing unit to perform recognition processing of the object without fusion, determines reliability of a recognition processing result, and performs power source
(Continued)

supply control of another signal processing module on the basis of a determination result.

9 Claims, 4 Drawing Sheets

(51) Int. Cl.
*G06F 1/3203* (2019.01)
*G06F 1/3287* (2019.01)
*G06F 1/329* (2019.01)

(56) References Cited

U.S. PATENT DOCUMENTS

| | | | |
|---|---|---|---|
| 2014/0247206 A1* | 9/2014 | Grokop | G06F 1/3287 345/156 |
| 2014/0368688 A1* | 12/2014 | John Archibald | G06F 1/3215 348/222.1 |
| 2018/0032042 A1* | 2/2018 | Turpin | H04N 13/296 |
| 2020/0278681 A1* | 9/2020 | Gier | G06V 20/56 |

* cited by examiner

IMAGE RECOGNITION DEVICE AND IMAGE RECOGNITION METHOD

CROSS REFERENCE TO RELATED APPLICATIONS

This application is a U.S. National Phase of International Patent Application No. PCT/JP2021/007945 filed on Mar. 2, 2021, which claims priority benefit of Japanese Patent Application No. JP 2020-075959 filed in the Japan Patent Office on Apr. 22, 2020. Each of the above-referenced applications is hereby incorporated herein by reference in its entirety.

TECHNICAL FIELD

The present disclosure (present technology) relates to an image recognition device and an image recognition method by the image recognition device.

BACKGROUND ART

In recent years, a technology for recognizing an object in an image detected by a sensor has been known. In such an object recognition technology, a recognition sensor represented by a stereo image sensor, a millimeter wave radar, a laser radar, or the like is generally used, but detection accuracy of these recognition sensors varies depending on a surrounding environment. For this reason, a method called sensor fusion in which an object is recognized by a combination of results of detection by respective recognition sensors is used (Patent Document 1).

In the method disclosed in Patent Document 1, a stereo image sensor, a millimeter wave radar, and a laser radar are simultaneously operated, data is processed, and object recognition is performed.

CITATION LIST

Patent Document
 Patent Document 1: Japanese Patent Application Laid-Open No. 2007-310741

SUMMARY OF THE INVENTION

Problems to be Solved by the Invention

However, in the method disclosed in Patent Document 1, since a large number of sensors is simultaneously operated and also output data thereof is simultaneously processed, power, a calculation amount, a memory occupancy amount, and a bus band occupancy amount increase.

The present disclosure has been made in view of such circumstances, and an object thereof is to provide an image recognition device and an image recognition method capable of reducing power, a calculation amount, a memory occupancy amount, and a bus band occupancy amount and maintaining high recognition accuracy.

Solutions to Problems

An aspect of the present disclosure is an image recognition device including a plurality of signal processing modules that connects a plurality of image sensors having different functions, performs signal processing on the basis of image signals output from connected image sensors and including an object within a predetermined imaging visual field, and is each capable of being controlled for power source supply, a recognition processing unit that selectively performs recognition processing of the object by an output signal of one signal processing module and recognition processing of the object with fusion of corresponding output signals of the plurality of signal processing modules, and a control unit that controls performance/stop of recognition processing of the object with the fusion for the recognition processing unit by supplying a power source to at least one signal processing module among the plurality of signal processing modules at the time of activation, causing the recognition processing unit to perform recognition processing of the object without fusion, determining reliability of a recognition processing result, and performing power source supply control of another signal processing module on the basis of a determination result.

Another aspect of the present disclosure is an image recognition method including connecting a plurality of image sensors having different functions, supplying a power source to at least one signal processing module among a plurality of signal processing modules capable of being controlled power source supply, and performing signal processing on the basis of image signals output from the image sensors and including an object within a predetermined imaging visual field, performing recognition processing of the object without fusion with another output signal on an output signal of an operating signal processing module, determining reliability of a recognition processing result, and controlling performance/stop of recognition processing of the object with fusion with an output signal of another signal processing module by performing power source supply control of another signal processing module on the basis of a determination result.

MODE FOR CARRYING OUT THE INVENTION

Hereinafter, embodiments of the present disclosure will be described with reference to the drawings. In the description of the drawings referred to in the following description, the same or similar portions are denoted by the same or similar reference signs, and duplicate description will be omitted. However, it should be noted that the drawings are schematic, and the relation between thicknesses and plane dimensions, the ratio of the thickness of each device and each member, and the like are different from actual ones. Therefore, specific thicknesses and dimensions should be determined in consideration of the following description. Furthermore, it is needless to say that portions having different dimensional relation and ratios are included between the drawings.

Note that the effects described in the present specification are merely examples and are not limited thereto, and other effects may be provided.

First Embodiment

<Configuration of Image Recognition Device>

Figure 1:
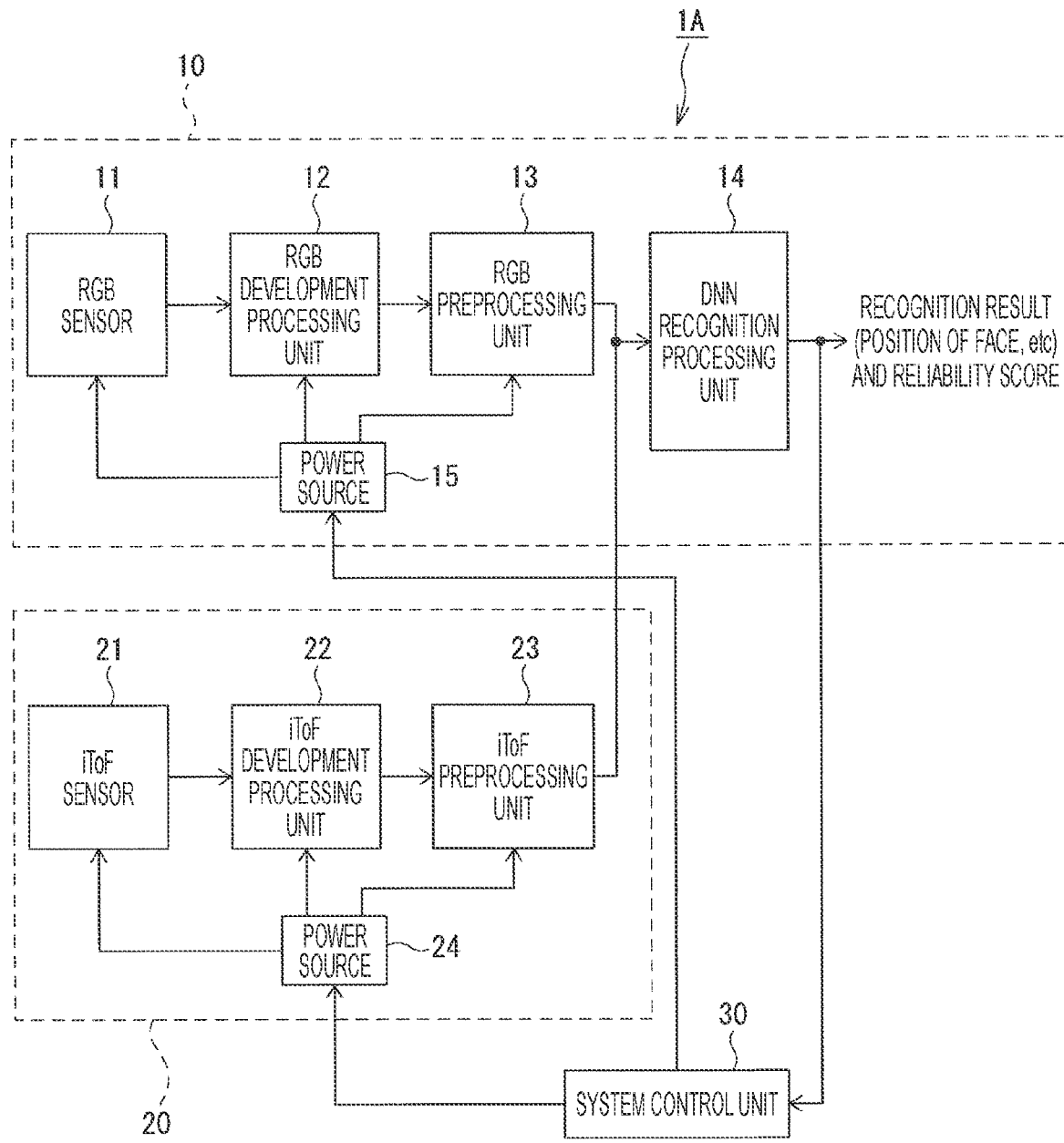
FIG. 1 is a block configuration diagram of an image recognition device according to a first embodiment of the present disclosure.

As illustrated in FIG. 1, an image recognition device 1A according to a first embodiment of the present disclosure includes an RGB processing module 10, an indirect time of flight (iToF) processing module 20, and a system control unit 30, and recognizes an object by processing signals from image sensors that detect an external situation. Note that the recognized object is, for example, the presence or absence of a face in the visual field, position detection of a face, joint positions of a human in the visual field, a gesture type of a hand, and the like.

In the first embodiment of the present disclosure, an example will be described in which two types of image sensors having different detection characteristics of an RGB sensor 11 and a distance measuring sensor 21 of an iToF method (hereinafter, referred to as an iToF sensor 21) are used, and information related to an object recognized on the basis of output from each of the image sensors is integrated (fused), thereby recognizing the object with high accuracy.

In addition to the RGB sensor 11, the RGB processing module 10 includes an RGB development processing unit 12, an RGB preprocessing unit 13, a deep neural network (DNN) recognition processing unit 14, and a power source 15. The RGB sensor 11, the RGB development processing unit 12, and the RGB preprocessing unit 13 form one signal processing module. The RGB sensor 11 generates and accumulates a charge according to the amount of light received from a predetermined imaging visual field, and generates and outputs an image signal of the imaging visual field of, for example, 30 frames per second according to the accumulation amount of the charge. The RGB development processing unit 12 obtains a feature amount for identifying an object on the basis of the image signal output from the RGB sensor 11. As the feature amount, a position coordinate value of the object is obtained.

The RGB preprocessing unit 13 performs preprocessing such as image resizing on the basis of the feature amount output from the RGB development processing unit 12. The information of the object processed by the RGB preprocessing unit 13 is output to the DNN recognition processing unit 14. The DNN recognition processing unit 14 selectively performs, on the output from the RGB preprocessing unit 13, recognition processing of the object by a DNN without fusion with the output from the iToF processing module 20 and recognition processing with the fusion with the output from the iToF processing module 20, and calculates a reliability score of the recognition processing result (for example, a range of 0 to 1) on the basis of the luminance of the image signal or weather. Then, the DNN recognition processing unit 14 outputs the recognition processing result and the reliability score of the recognition processing result to the system control unit 30.

The system control unit 30 determines the input reliability score of the recognition processing result, and performs power source supply control for the iToF processing module 20 on the basis of the determination result. The power source 15 supplies power to the RGB sensor 11, the RGB development processing unit 12, and the RGB preprocessing unit 13.

On the other hand, the iToF processing module 20 includes an iToF development processing unit 22, an iToF preprocessing unit 23, and a power source 24 in addition to the iToF sensor 21. The iToF sensor 21 emits light, receives light reflected by an object, generates and accumulates a charge according to the amount of the received light, and generates and outputs an image signal of an imaging visual field of, for example, 30 frames per second according to the accumulation amount of the charge. The iToF development processing unit 22 obtains a feature amount for identifying an object on the basis of the image signal output from the iToF sensor 21. As the feature amount, for example, a distance coordinate value to the object is obtained on the basis of a phase signal corresponding to the accumulated charge amount.

The iToF preprocessing unit 23 performs preprocessing such as image resizing and parallax correction on the basis of the feature amount output from the iToF development processing unit 22. Here, the iToF preprocessing unit 23 converts the output signal of the iToF development processing unit 22 into a signal corresponding to the output signal of the RGB preprocessing unit 13. The output signal of the iToF preprocessing unit 23 is output to the DNN recognition processing unit 14. The power source 24 supplies power to the iToF sensor 21, the iToF development processing unit 22, and the iToF preprocessing unit 23.

The system control unit 30 performs on/off control of the power sources 15 and 24 on the basis of a control signal from the DNN recognition processing unit 14.

Comparative Example 1

Figure 2:
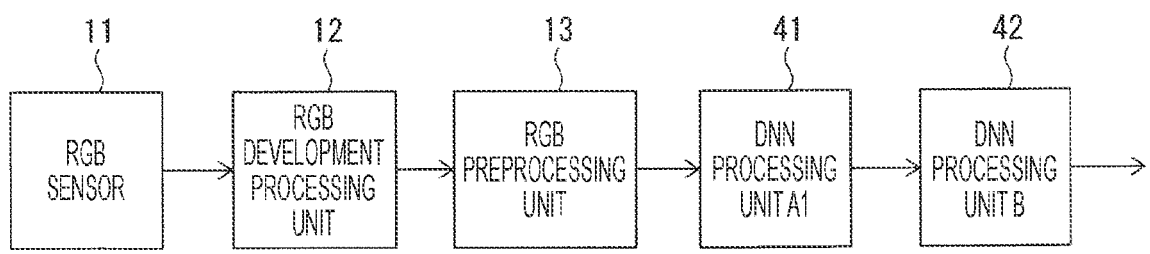
FIG. 2 is a block configuration diagram illustrating an example of the image recognition device in Comparative Example 1.

FIG. 2 is a block configuration diagram illustrating an example of the image recognition device in Comparative Example 1. In FIG. 2, the same portions as those in FIG. 1 described above are denoted by the same reference signs, and detailed description thereof is omitted.

Comparative Example 1 is an example in which an object is recognized using only the RGB sensor 11. A DNN processing unit A141 performs recognition processing of an object by a DNN on output from the RGB preprocessing unit 13. A DNN processing unit B42 calculates reliability of the recognition processing result output from the DNN processing unit A141.

Meanwhile, in the RGB sensor 11, since an image signal of the imaging visual field is generated by visible light, there is a case where an object cannot be recognized due to weather or ambient brightness.

Comparative Example 2

Figure 3:
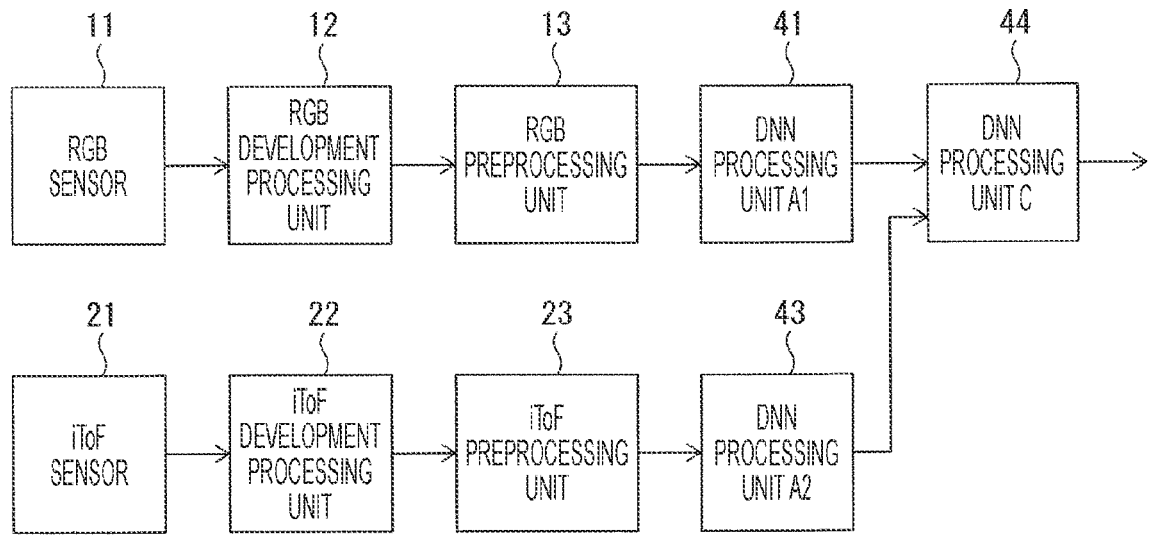
FIG. 3 is a block configuration diagram illustrating an example of the image recognition device in Comparative Example 2.

FIG. 3 is a block configuration diagram illustrating an example of the image recognition device in Comparative Example 2. In FIG. 3, the same portions as those in FIG. 1 and FIG. 2 described above are denoted by the same reference signs, and detailed description thereof is omitted.

Comparative Example 2 is an example in which an object is recognized by output from the RGB sensor 11 and output from the iToF sensor 21 being fused. A DNN processing unit A243 performs recognition processing of an object by a DNN on output from the iToF preprocessing unit 23. A DNN processing unit C44 fuses and outputs recognition processing result output from the DNN processing unit A141 and authentication processing result output from the DNN processing unit A243.

Meanwhile, in Comparative Example 2, the power, the arithmetic processing amount, the memory occupancy amount, and the bus band occupancy amount increase by the iToF sensor 21, the iToF development processing unit 22, the iToF preprocessing unit 23, and the DNN processing unit A243.

Measures According to First Embodiment

Figure 4:
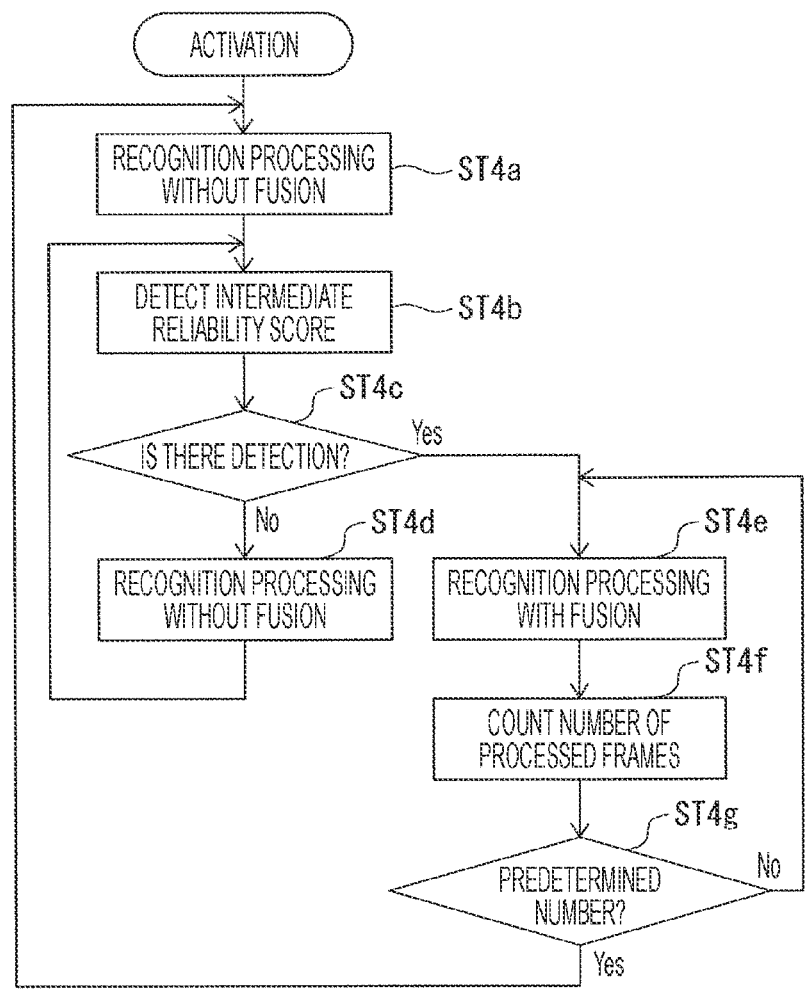
FIG. 4 is a flowchart illustrating a control processing procedure of a system control unit according to the first embodiment of the present disclosure.
Figure 5:
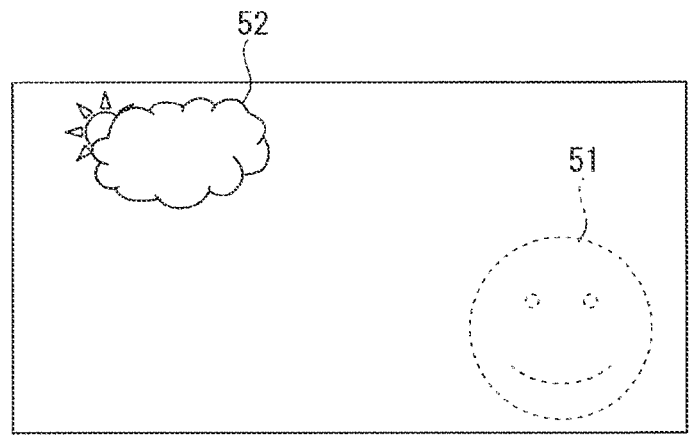
FIG. 5 is a diagram illustrating an image example of an object recognized by an RGB sensor alone in the first embodiment of the present disclosure.

Therefore, in the first embodiment of the present disclosure, the system control unit 30 performs a control processing procedure illustrated in FIG. 4. At the time of activation, the system control unit 30 turns on the power source 15, causes the DNN recognition processing unit 14 to perform recognition processing by a DNN without fusion and only by output from the RGB preprocessing unit 13 (step ST4a), detects an intermediate reliability score (for example, 0.3 to 0.7) from a reliability score of the input recognition processing result (step ST4b), and determines whether or not there is detection (step ST4c). Here, the intermediate reliability score is a value at which an object 51 illustrated in FIG. 5 is recognized by the RGB sensor 11. The RGB sensor 11 is affected by weather 52, and the accuracy of recognizing the object 51 decreases. Note that in a case where the reliability score is less than 0.3, the detection can be assured to be erroneous and not to be the object 51.

In a case where there is determined to be no detection (No), the system control unit 30 causes the DNN recognition processing unit 14 to continue the recognition processing without the fusion (step ST4d), and proceeds to the processing of step ST4b described above.

Figure 6:
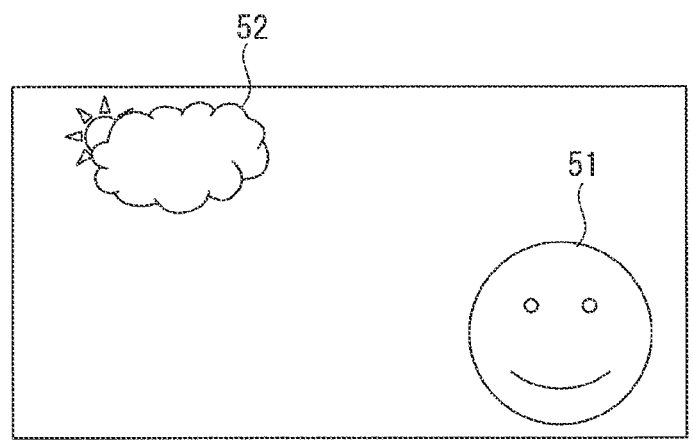
FIG. 6 is a diagram illustrating an image example of an object recognized with fusion of an iToF sensor and the RGB sensor in the first embodiment of the present disclosure.

On the other hand, in a case where there is determined to be detection (Yes), the system control unit 30 turns on the power source 24 of the iToF processing module 20, causes the DNN recognition processing unit 14 to perform recognition processing with the fusion of output from the RGB preprocessing unit 13 and output from the iToF preprocessing unit 23 (step ST4e), and counts the number of processed frames (step ST4f). Since the iToF sensor 21 irradiates the object 51 with light, as illustrated in FIG. 6, the object 51 can be reliably recognized without being affected by the weather 52.

Then, the system control unit 30 determines whether or not the counted number of processed frames has reached, for example, 1000 frames (step ST4g). Here, in a case of not reaching 1000 frames (No), the system control unit 30 repeatedly performs the processing of step ST4e and step ST4f described above until the number of processed frames reaches 1000 frames, and at the time of reaching 1000 frames (Yes), the system control unit 30 proceeds to the processing of step ST4a described above, turns off the power source 24 of the iToF processing module 20, and causes the DNN recognition processing unit 14 to perform the recognition processing without the fusion.

Operation and Effects According to First Embodiment

As described above, according to the first embodiment, the power source 15 of the RGB processing module 10 to which the RGB sensor 11 having the lowest power consumption among the image sensors is connected is turned on, the DNN recognition processing unit 14 performs the recognition processing of an object without the fusion on an output signal of the RGB preprocessing unit 13, the system control unit 30 determines reliability of the recognition processing result, and in a case where the reliability is high as a result, the recognition processing is continued without the fusion, and in a case where only a result of low reliability is obtained, the recognition processing is performed with the fusion with an output signal of the iToF processing module 20.

Therefore, under a condition in which a highly reliable recognition result can be obtained only by the RGB sensor 11, the power, the calculation amount, the memory occupancy amount, and the bus band occupancy amount can be reduced. On the other hand, in a case of a condition in which using only the RGB sensor 11 is disadvantageous, the iToF processing module 20 is automatically used in combination, and high recognition accuracy is maintained.

Furthermore, according to the first embodiment, prior to performance of the recognition processing with the fusion by the DNN recognition processing unit 14, an output signal of the RGB preprocessing unit 13 and an output signal of the iToF preprocessing unit 23 to be fused can be substantially matched, so that the recognition processing with the fusion can be performed by a simple procedure.

Furthermore, according to the first embodiment, at the time of performance control of the authentication processing with the fusion, the authentication processing with the fusion is repeated for a predetermined number of frames, and at the time of reaching the predetermined number of frames, by returning to the performance control of the authentication processing without the fusion, a possibility that the condition is changed and the fusion is no longer necessary again can be checked with low frequency, and with this arrangement, in a case where the state where the reliability is low is temporary and returns to normal thereafter, automatically returning to the performance control of the authentication processing without the fusion is possible, and thus the power consumption of the entire system can be reduced.

Moreover, according to the first embodiment, the reliability of the recognition processing result is calculated by the DNN recognition processing unit 14 on the basis of the luminance of an image signal obtained from the RGB sensor 11 or weather, and the performance control of the authentication processing without the fusion is performed on the DNN recognition processing unit 14 in a case where the system control unit 30 determines that the reliability does not fall within a determined range, accordingly, in a case where the reliability is high outside the range, the RGB sensor 11 alone can reliably recognize an object, and in a case where the reliability is low outside the range, the detection can be assured to be erroneous and not to be the object.

Note that, in the first embodiment, an example has been described in which the luminance of an image signal or the weather is used for calculating a reliability score, but dirt of the lens of the RGB sensor 11 or the like may be used. Furthermore, an example has been described in which the number of processed frames of image signals is used as a condition for returning from the recognition processing with the fusion to the recognition processing without the fusion, however, for example, a period of time or a signal from the outside may be used. Moreover, in addition to a DNN, a reliability score can be calculated by Adaboost.

Second Embodiment

Next, a second embodiment will be described. The second embodiment is a modification of the first embodiment, and includes an RGB processing module 10, a direct (d) ToF processing module 60, and a system control unit 30, and recognizes an object by processing signals from image sensors that detect an external situation.

Figure 7:
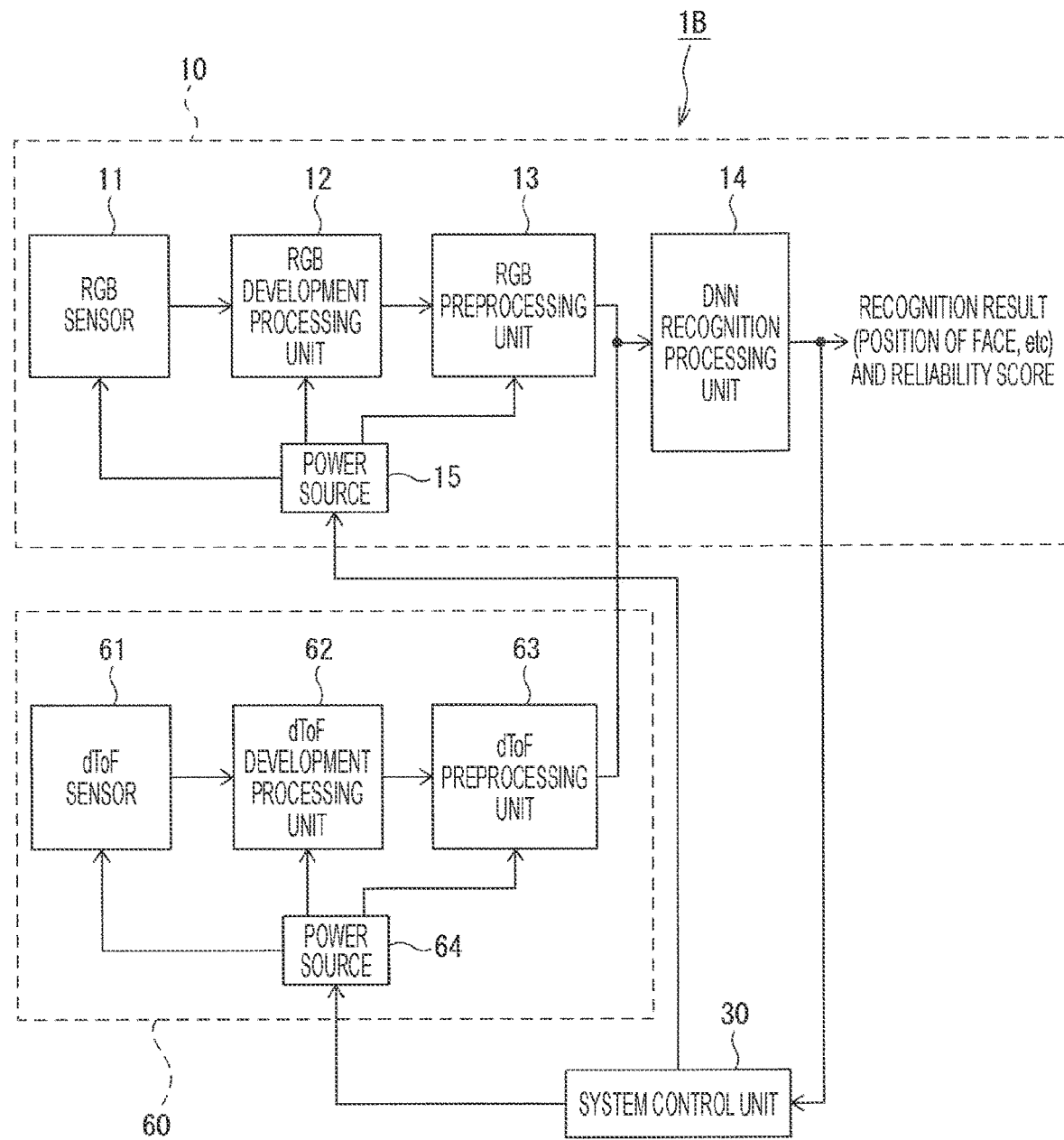
FIG. 7 is a block configuration diagram of an image recognition device according to a second embodiment of the present disclosure.

FIG. 7 is a block configuration diagram illustrating an image recognition device 1B according to the second embodiment. In FIG. 7, the same portions as those in FIG. 1 described above are denoted by the same reference signs, and detailed description thereof is omitted.

The dToF processing module 60 includes a distance measuring sensor 61 of the dToF method (hereinafter, referred to as a dToF sensor 61), a dToF development processing unit 62, a dToF preprocessing unit 63, and a power source 64. The dToF sensor 61 emits single pulsed light and detects reflected light for the light emission (photons). The dToF sensor 61 outputs an image signal of an imaging frame having distance information for every pixel by reading out photons for every pixel column arranged in a line form.

The dToF development processing unit 62 obtains a feature amount for identifying an object on the basis of the image signal output from the dToF sensor 61. As the feature amount, a distance coordinate value to the object is obtained.

The dToF preprocessing unit 63 performs preprocessing such as image resizing and parallax correction on the basis of the feature amount output from the dToF development processing unit 62. Here, the dToF preprocessing unit 63 converts the output signal of the dToF development processing unit 62 into a signal corresponding to an output signal of an RGB preprocessing unit 13. The output signal of the dToF preprocessing unit 63 is output to the DNN recognition processing unit 14. The power source 64 supplies power to the dToF sensor 61, the dToF development processing unit 62, and the dToF preprocessing unit 63.

Since the dToF sensor 61 irradiates an object with single pulse light similarly to the iToF sensor 21, the object can be reliably recognized without being affected by weather.

Operation and Effects According to Second Embodiment

As described above, also in the second embodiment, the similar effects as those of the first embodiment can be obtained.

Other Embodiments

As described above, the present technology has been described according to the first embodiment and the second embodiment, but it should not be understood that the description and the drawings forming a part of this disclosure limit the present technology. It will be apparent to those skilled in the art that various alternative embodiments, implementation examples, and operation technology may be included in the present technology upon understanding the spirit of the technical content disclosed by the embodiments described above. Furthermore, the configurations disclosed in the first embodiment and the second embodiment can be appropriately combined within a range in which no contradiction occurs. For example, configurations disclosed by a plurality of different embodiments may be combined, or configurations disclosed by a plurality of different modifications of the same embodiment may be combined.

Other Application Examples

The technology according to the present disclosure is applied to, for example, a case where a patient is examined in a hospital room, a station, a security room, and the like. In a case where a patient is recognized by an image recognition device installed in a hospital room, the recognition result is transmitted from the hospital room to a monitoring room.

Note that the technology can also have the following configurations.

(1)

An image recognition device including
 a plurality of signal processing modules that connects a plurality of image sensors having different functions, performs signal processing on the basis of image signals output from connected image sensors and including an object within a predetermined imaging visual field, and is each capable of being controlled for power source,
 a recognition processing unit that selectively performs recognition processing of the object by an output signal of one signal processing module and recognition processing of the object with fusion of corresponding output signals of the plurality of signal processing modules, and
 a control unit that controls performance/stop of recognition processing of the object with the fusion for the recognition processing unit by supplying a power source to at least one signal processing module among the plurality of signal processing modules at the time of activation, causing the recognition processing unit to perform recognition processing of the object without fusion, determining reliability of a recognition processing result, and performing power source supply control of another signal processing module on the basis of a determination result.

(2)

The image recognition device according to the (1), in which
 the plurality of signal processing modules includes
 a first signal processing module to which one image sensor is connected, and
 a second signal processing module to which another image sensor is connected and converts an image signal output from the image sensor into a signal corresponding to an output signal of the first signal processing module.

(3)

The image recognition device according to the (1) or (2), in which
 the control unit causes the recognition processing unit to return to performance control of authentication processing without the fusion on the basis of a predetermined condition at the time of performance control of authentication processing with the fusion.

(4)

The image recognition device according to the (3), in which
 the control unit repeatedly performs authentication processing with the fusion for a predetermined number of frames on corresponding image signals of a plurality of frames output from the plurality of signal processing modules in the recognition processing unit as the condition, and returns to performance control of authentication processing without the fusion at the time of reaching a predetermined number of frames.

(5)
The image recognition device according to any one of the (1) to (4), in which
the recognition processing unit calculates reliability of the recognition processing result on the basis of at least one of luminance of an image signal obtained from the image sensor, weather, or dirt of the image sensor, and
the control unit performs performance control of authentication processing without the fusion in a case where the reliability does not fall within a determined range.

(6)
The image recognition device according to any one of the (1) to (5), in which
at least one of the plurality of image sensors is an RGB sensor, and another image sensor is a distance measuring sensor of an indirect time of flight (ToF) method.

(7)
The image recognition device according to any one of the (1) to (5), in which
at least one of the plurality of image sensors is an RGB sensor, and another image sensor is a distance measuring sensor of a direct time of flight (ToF) method.

(8)
The image recognition device according to the (6) or (7), in which
the control unit supplies a power source to a signal processing module to which the RGB sensor is connected, and performs recognition processing of the object without the fusion on an output signal of an operating signal processing module.

(9)
An image recognition method including
connecting a plurality of image sensors having different functions, supplying a power source to at least one signal processing module among a plurality of signal processing modules capable of being controlled power source supply, and performing signal processing on the basis of image signals output from the image sensors and including an object within a predetermined imaging visual field,
performing recognition processing of the object without fusion with another output signal on an output signal of an operating signal processing module,
determining reliability of a recognition processing result, and
controlling performance/stop of recognition processing of the object with fusion with an output signal of another signal processing module by performing power source supply control of another signal processing module on the basis of a determination result.

REFERENCE SIGNS LIST 1A, 1B Image recognition device
10 RGB processing module
11 RGB sensor
12 RGB development processing unit
13 RGB preprocessing unit
14 DNN recognition processing unit
15, 24, 64 Power source
20 iToF processing module
21 iToF sensor
22 iToF development processing unit
23 iToF preprocessing unit
30 System control unit
51 Object
52 Weather
60 dToF processing module
61 dToF sensor
62 dToF development processing unit
63 dToF preprocessing unit.

The invention claimed is:

1. An image recognition device, comprising:
a plurality of signal processors that are configured to be connected with a plurality of image sensors having different functions, wherein the plurality of signal processors are further configured to perform signal processing based on image signals output from the plurality of image sensors, and the plurality of signal processors are further configured to be controlled from a power source supply;
a recognition processor configured to selectively:
recognize an object, within a determined imaging field, based on an output signal of a first signal processor of the plurality of signal processors, and
recognize the object based on fusion of corresponding output signals of the plurality of signal processors; and
a control processor that is configured to control the recognition of the object based on:
control of the power source supply of the first signal processor of the plurality of signal processors,
recognition of the object without the fusion based on the output signal of the first signal processor,
determination of a reliability score of the recognition, and
control of the power source supply of a second signal processor of the plurality of signal processors based on the determined reliability score.

2. The image recognition device according to claim 1, wherein
the plurality of signal processors includes:
the first signal processor to which a first image sensor, of the plurality of image sensors, is connected; and
the second signal processor to which a second image sensor, of the plurality of image sensors, is connected, and the second signal processor is configured to convert an image signal output from the second image sensor into a signal corresponding to an output signal of the first signal processor.

3. The image recognition device according to claim 1, wherein
the control processor is further configured to cause the recognition processor to perform a first authentication processing without the fusion based on a determined condition related to a second authentication processing with the fusion.

4. The image recognition device according to claim 3, wherein
the control processor is further configured to:
repeatedly perform the second authentication processing with the fusion for a determined number of frames on corresponding image signals of a plurality of frames output from the plurality of signal processors as the determined condition, and
perform the first authentication processing without the fusion based on the second authentication processing with the fusion for the determined number of frames.

5. The image recognition device according to claim 1, wherein the recognition processor is further configured to calculate the reliability score of the recognition based on luminance of one of the image signals output obtained from an image sensor of the plurality of image sensors, and the control processor is further configured to perform a first authentication processing without the fusion based on a determination that the reliability score is above a determined range.

6. An image recognition device, comprising:
a plurality of signal processors that are configured to be connected with a plurality of image sensors having different functions, and configured to perform signal processing based on image signals output from the plurality of image sensors, wherein the plurality of signal processors are controlled from a power source supply:
a recognition processor that is configured to selectively recognize an object based on an output signal of a first signal processor of the plurality of signal processors and recognize the object based on fusion of corresponding output signals of the plurality of signal processors; and
a control processor that is configured to control the recognition of the object based on:
  control of the power source supply of the first signal processor of the plurality of signal processors,
  recognition of the object without the fusion based on the output signal of the first signal processor,
  determination of a reliability score of the recognition, and
  control of the power source supply of a second signal processor of the plurality of signal processors based on the determined reliability score, wherein
at least one of the plurality of image sensors is an RGB sensor, and another image sensor is a distance measuring sensor of an indirect time of flight (ToF) method.

7. The image recognition device according to claim 1, wherein
at least one of the plurality of image sensors is an RGB sensor, and another image sensor is a distance measuring sensor of a direct time of flight (ToF) method.

8. The image recognition device according to claim 6, wherein
the control processor is further configured to control the power source supply of the first signal processor to which the RGB sensor is connected, and recognize the object without the fusion on an output signal of an operating signal processor.

9. An image recognition method, comprising:
in an image recognition device:
  connecting a plurality of image sensors having different functions to a plurality of signal processors;
  controlling a power source supply to a first signal processor of the plurality of signal processors;
  performing signal processing based on image signals output from the plurality of image sensors;
  performing recognition of an object, within a determined imaging visual field, without fusion based on a first image signal, of the image signals, output from the first signal processor;
  determining a reliability score of the recognition; and
  controlling, based on the determined reliability score, the recognition of the object with fusion of a second image signal, of the image signals, output from a second signal processor, of the plurality of signal processors, wherein the recognition of the object with the fusion is based on control of the power source supply of the second signal processor.

* * * * *